US007533813B2

(12) United States Patent

Knowles

(10) Patent No.: US 7,533,813 B2
(45) Date of Patent: May 19, 2009

(54) WIRELESS VOTING METHOD

(75) Inventor: Anthony M. Knowles, Hampshire (GB)

(73) Assignee: IML Limited, Liphook, Hampshire (GB)

( * ) Notice: Subject to any disclaimer, the term of this patent is extended or adjusted under 35 U.S.C. 154(b) by 524 days.

(21) Appl. No.: 11/110,873

(22) Filed: Apr. 21, 2005

(65) Prior Publication Data

US 2006/0242455 A1 Oct. 26, 2006

(51) Int. Cl.
*G06K 17/00* (2006.01)
*G06F 11/00* (2006.01)
*G07C 13/00* (2006.01)
*G09B 9/00* (2006.01)
*G09B 19/00* (2006.01)

(52) U.S. Cl. .......................... 235/386; 705/12; 434/306

(58) Field of Classification Search ................. 235/386; 705/12; 434/306; 710/44; 725/16, 24; 714/6
See application file for complete search history.

(56) References Cited

U.S. PATENT DOCUMENTS

| | | | | |
|---|---|---|---|---|
| 3,947,669 | A * | 3/1976 | Simmons et al. | 705/12 |
| 4,046,992 | A * | 9/1977 | Huhn et al. | 235/54 F |
| 4,290,141 | A * | 9/1981 | Anderson et al. | 725/24 |
| 4,764,120 | A * | 8/1988 | Griffin et al. | 434/336 |
| 5,189,288 | A * | 2/1993 | Anno et al. | 235/386 |
| 5,226,177 | A * | 7/1993 | Nickerson | 725/24 |
| 5,273,437 | A * | 12/1993 | Caldwell et al. | 434/351 |
| 5,303,042 | A | 4/1994 | Lewis et al. | |
| 5,357,609 | A | 10/1994 | Sellers et al. | |
| 5,400,248 | A * | 3/1995 | Chisholm | 705/12 |
| 5,724,357 | A * | 3/1998 | Derks | 370/313 |
| 5,870,214 | A | 2/1999 | Knowles | |
| 6,540,138 | B2 * | 4/2003 | Hall et al. | 235/386 |
| 6,964,372 | B1 * | 11/2005 | Peterson | 235/386 |
| 7,032,821 | B2 * | 4/2006 | McClure et al. | 235/386 |
| 7,036,730 | B2 * | 5/2006 | Chung | 235/386 |
| 7,237,717 | B1 * | 7/2007 | Rao et al. | 235/386 |
| 2001/0035455 | A1 * | 11/2001 | Davis et al. | 235/375 |
| 2001/0042005 | A1 * | 11/2001 | McClure et al. | 705/12 |
| 2002/0019767 | A1 * | 2/2002 | Babbitt et al. | 705/12 |
| 2002/0028657 | A1 * | 3/2002 | Davies | 455/41 |
| 2002/0038819 | A1 * | 4/2002 | Ushioda et al. | 235/386 |
| 2002/0074399 | A1 * | 6/2002 | Hall et al. | 235/386 |
| 2002/0107724 | A1 * | 8/2002 | Openshaw et al. | 705/12 |
| 2002/0143610 | A1 * | 10/2002 | Munyer | 705/12 |
| 2002/0161628 | A1 * | 10/2002 | Lane Poor et al. | 705/12 |
| 2003/0040956 | A1 * | 2/2003 | Gaston | 705/12 |
| 2003/0047604 | A1 * | 3/2003 | McClure et al. | 235/386 |
| 2003/0094489 | A1 * | 5/2003 | Wald | 235/386 |
| 2003/0100321 | A1 * | 5/2003 | Rao et al. | 455/466 |
| 2003/0149616 | A1 * | 8/2003 | Travaille | 705/12 |

(Continued)

FOREIGN PATENT DOCUMENTS

| | | |
|---|---|---|
| DE | 203 16 306 U1 | 4/2004 |

(Continued)

*Primary Examiner*—Daniel Walsh
(74) *Attorney, Agent, or Firm*—Dickstein Shapiro LLP

(57) ABSTRACT

A wireless voting method is disclosed. The method comprises generating an optical voting indication (140), and controlling a plurality of handsets (112), capable of electromagnetically transmitting a vote input (150) by a user, and a vote registering arrangement (130), capable of receiving and registering transmitted votes, to register votes for handsets responding to the optical indication (140) in a predetermined manner.

41 Claims, 5 Drawing Sheets

U.S. PATENT DOCUMENTS

| | | | | |
|---|---|---|---|---|
| 2003/0208395 | A1* | 11/2003 | McClure et al. | 705/12 |
| 2003/0215780 | A1* | 11/2003 | Saar et al. | 434/351 |
| 2004/0033478 | A1* | 2/2004 | Knowles et al. | 434/350 |
| 2004/0060983 | A1* | 4/2004 | Davis et al. | 235/386 |
| 2005/0043988 | A1* | 2/2005 | Illsley et al. | 705/12 |
| 2006/0036481 | A1* | 2/2006 | White | 705/12 |
| 2006/0138226 | A1* | 6/2006 | McClure et al. | 235/386 |
| 2006/0226221 | A1* | 10/2006 | Langberg | 235/386 |
| 2006/0242455 | A1* | 10/2006 | Knowles | 714/6 |
| 2007/0170252 | A1* | 7/2007 | Orton | 235/386 |
| 2007/0185761 | A1* | 8/2007 | Mori et al. | 705/12 |
| 2007/0192785 | A1* | 8/2007 | Pellinat et al. | 725/24 |
| 2007/0241190 | A1* | 10/2007 | Hotto et al. | 235/386 |
| 2007/0264993 | A1* | 11/2007 | Hughes | 455/422.1 |
| 2008/0096177 | A1* | 4/2008 | Beamish | 434/351 |
| 2008/0105742 | A1* | 5/2008 | Kim et al. | 235/386 |

FOREIGN PATENT DOCUMENTS

| | | | |
|---|---|---|---|
| DE | 20 2004 006 554 | U1 | 7/2004 |
| EP | 1 280 082 | A1 | 1/2003 |
| EP | 1 353 299 | A2 | 10/2003 |
| GB | 2 392 056 | A | 2/2004 |

* cited by examiner

WIRELESS VOTING METHOD

The present invention relates to a wireless voting method and system. In particular it relates to a system for restricting the use of electronic voting to an authorised region.

Electronic voting systems for are well known in the art. Such systems have wide applicability. For example, in a conference, conference participants can be provided with units or handsets which enable conference participants to vote on motions raised during the conference. These systems also have applicability for any type of voting application such as audience voting for entertainment programmes. They are also useful for conducting votes within organizations, for example to elect members of boards or committees, or to decide on matters at board meetings.

Voting systems can be generally divided into two categories: hardwired systems and wireless systems. A hardwired system is for example disclosed in U.S. Pat. No. 5,303,042 and U.S. Pat. No. 5,357,609. However, hardwired systems suffer from the disadvantage of requiring cables to connect each of the handsets to be used by participants in a vote. Thus these systems are less transportable and flexible.

Wireless voting systems can use any type of wireless communication system. For example, U.S. Pat. No. 5,870,214 discloses a system using infra-red as the transmission medium. This system is advantageous in that it is less prone to interference. The system does however require a line of sight between transmitters and receivers at the time of voting. Other wireless systems use radio frequency transmissions between transmitters and receivers. Such a system is disclosed in U.S. Pat. No. 5,273,437, the content of which is hereby incorporated by reference. This document discloses an audience participation system which uses the spread spectrum communication protocol for communication between keypads and a base station. Keypads are coded with characteristics to identify users to enable audience responses to be individually identified. This coding can be achieved by providing a bar code scanner to scan a conference badge worn by the user. To enable full participation the keypads are also provided with an audio capability enabling voice input to be transmitted over the wireless system. Another RF wireless system is disclosed in U.S. Pat. No. 5,724,357, the content of which is hereby incorporated by reference, in which voice responses and keypad responses can be transmitted from handsets to a system controller.

GB 2 392 056, the content of which is hereby incorporated by reference, discloses a participant response system comprising a plurality of wireless handsets to enable participants in an event or an audience to provide responses. The system can be used to conduct a vote.

FIG. 1 is a schematic of a known wireless voting system, such as that disclosed in GB 2 392 056. The system 100 comprises a plurality 110 of handsets 112, 114, 116 and a voting controller 130.

During a voting period, voters enter into respective handsets 112, 114, 116 a voting input, such as a preference in a ballot, or a yes/no answer, and the handsets 112, 114, 116 transmit the voting input to the voting controller. The voting controller then processes the received voting inputs and generates an appropriate voting result.

Such a wireless voting system provides a convenient solution in circumstances where formerly other voting systems were used, such as a paper ballot, or the use of "yes" and "no" doors leading out of a voting area. However, often there is a rule that "members must be in the [voting] room to vote", and wireless voting systems can allow this rule to be violated, for example by a member walking out of a voting room with one of the handsets, and then casting a vote from outside the room.

Following consideration of the problems mentioned above, the present invention provides a wireless voting method comprising generating an optical voting indication, and controlling a plurality of handsets, capable of electromagnetically transmitting a vote input by a user, and a vote registering arrangement, capable of receiving and registering transmitted votes, to register votes for handsets responding to the optical indication in a predetermined manner. The vote registering arrangement is preferably a voting controller, and the optical voting indication is preferably visible substantially only within line-of-sight of the source of the voting indication, for example by way of infrared or visible light waves. By contrast, the term 'electromagnetic transmission' as used herein preferably connotes a substantially non-line of sight (NLOS) transmission—that is, a transmission which can be received both with or without line of sight of the origin of the transmission, subject to considerations of transmission strength, interference, and so on. 'Electromagnetic transmissions' are preferably radio frequency transmissions, for example, but may include other transmissions having similar characteristics.

By registering votes for handsets responding to the optical indication in a predetermined manner, electromagnetic wireless voting can be restricted to a given voting area (within line of sight of the optical indication), without having to provide measures such as electromagnetic shielding, for example. Preferably no other votes are registered, in addition to those registered for handsets responding to the optical indication, but provisions may be made for exceptions to the rule, for example by manually entering details of approved handsets.

The optical indication may be a designated input, and the step of controlling further may comprise entering the designated input at a handset. The designated input may include a code, such as a sequence of symbols, or it may for example be an indication of a particular button or other control to press or activate. Such a code is preferably an alphanumeric sequence, such as a sequence of numbers or letters on a keypad, but may also include special symbols as found on a typical keypad, such as '#' and '*', for example. The designated input may be displayed in an appropriate form, such as a user-readable instruction (for example: "Press the red key now" or "Type 1523 into the keypad").

By requiring a designated input to be entered at the handset, the geographical validation process can be simplified, for example, to a comparison between an input entered by the user and a reference designated input, to determine whether the handset is validated. Accordingly, if pre-existing input device(s), such as a keypad used for text messaging, are used for the entry of the designated input, it can be the case that no substantial additional hardware elements are required in the handsets to put the invention into effect.

The designated input may be entered via an input device such as a keypad, although the designated input may include any of pushing a button, sliding a button, turning a wheel, touching a touch-screen, speaking into a microphone, scanning a magnetic or induction device, swiping a magnetic or optical card, scanning a barcode, pulling a cord or lever, moving the keypad, or orienting the keypad in a given direction, for example.

The method preferably further comprising generating the designated input, for example in accordance with a random number algorithm. This can allow unpredictable designated inputs to be generated, thus increasing the security of the system. Alternatively, the designated input may be generated in dependence on a determinable property of the system, such as a measurement of time. By using a secret or one-way algorithm (such as a hashing algorithm), and/or an algorithm further employing a secret key (such as a symmetric encryption key or a public/private key pair), for example, an unguessable designated input may nevertheless still be generated. A system clock, synchronised across the handsets and vote registering arrangement, may be used to generate the designated input, for example, and may further be used to seed a complex (or otherwise) algorithm to generate a numeric or alphanumeric code. The property (such as time) may be quantised such that it does not vary throughout the duration of a voting period, and accordingly is valid for the duration of the voting period. Alternatively, for example if the voting period is relatively long in duration, the designated input may be renewed periodically, and the user may be prompted to enter a new designated input as appropriate.

In one embodiment the designated input is generated at the vote registering arrangement, but it may alternatively or additionally be generated at each handset, for example using a determinable property mentioned above, such that the designated input need not be transmitted between the handsets and the vote registering arrangement, increasing the security of the system. Alternatively, the designated input may be transmitted to each handset, by the vote registering arrangement, for example, or by another entity such as a security server. Thus the designated input may be transmitted in one broadcast, rather than multiple times (from each handset to the vote registering arrangement, as before), thus reducing the risk of the system being compromised by electronic eavesdropping.

In one embodiment of the present invention, the step of controlling further comprises transmitting the vote input from a handset to the vote registering arrangement in dependence on whether the appropriate designated input is entered at the handset. Thus, if a designated input has not been entered, or a designated input has been entered but is incorrect, the handset can be prevented from sending the vote input, amongst other things reducing the wireless communications bandwidth taken up by invalid (unauthorised) transmissions of vote inputs.

In another embodiment of the present invention, the step of controlling further comprises transmitting the designated input from a handset to the vote registering arrangement, and registering the vote input in dependence on whether the appropriate designated input is received at the vote registering arrangement. In this case the validation occurs at the vote registering arrangement, and this can avoid invalid votes being cast as a result of users compromising the security of the handsets.

The method may further comprise displaying the optical voting indication, optionally at a plurality of locations. This can afford greater flexibility, and can allow substantially arbitrary voting areas to be defined by appropriate choice of displays and locations.

In another embodiment of the present invention, the step of controlling further comprises receiving the optical indication at a handset. In this case, preferably the step of controlling further comprises transmitting the vote input in dependence on whether the optical indication is received at the handset. Preferably an optical transmitter (such as an infrared lamp or LED) is provided at, or under the control of, the vote registering arrangement, and an optical receiver (such as an infrared receiver) is provided at each handset. Thus validation can be carried out without requiring the user to provide any input, and can increase the reliability of the system.

The method may further comprise outputting the optical voting indication. This may be done during a voting period to which the vote input relates, and/or before the start of a voting period to which the vote input relates. Thus the system can be configured, for example, to provide an authorisation period, during which validation takes place, and then to provide a separate voting period during which only validated handsets may vote. Alternatively, for example, the may be a single period for voting, during which handsets can be validated and then vote (or conduct both operations substantially simultaneously).

The method may yet further comprise allowing voting functions to be performed by the user of a handset on receipt of the optical voting indication at the handset, and preferably further comprises allowing non-voting functions to be performed by the user of a handset irrespective of receipt of the optical voting indication at the handset. Thus the user may continue to use non-voting functions of the handset (such as push-to-talk communication or messaging functions) even when outside the voting area. This can afford greater flexibility.

In another aspect of the invention, a wireless voting system is provided, comprising a voting controller having an interface to provide an output to generate an optical indication for voting validation, a reception device for receiving electromagnetically transmitted vote inputs, and a processor programmed to register vote inputs; and a plurality of handsets, each handset comprising an input device for receiving the indication of voting validation, and a transmission device for electromagnetically transmitting the vote input; the voting controller and each handset being adapted to cause the vote input to be registered by the voting controller if the indication of voting validation is received at the handset.

The voting controller may correspond to a vote registering arrangement as aforementioned, and may further include a transmission device for transmitting a designated input to the handsets. It may further include a memory, containing instructions to cause the processor to operate in accordance with aforementioned method steps, and a storage device, such as a hard disk, for recording registered votes.

The handsets may further include a processor and memory containing instructions to cause the processor to operate in accordance with aforementioned method steps, and/or a reception device for receiving a designated input. Other functionality and/or apparatus features may of course be provided in the handsets and in the voting controller.

In a further aspect, there is disclosed a wireless voting system comprising means (such as an interface) for outputting an optical indication for voting validation, means (such as a wireless receiver) for receiving electromagnetically transmitted vote inputs, means (such as a processor and associated memory) for registering vote inputs; and a plurality of handsets, each handset including means (such as a wireless receiver) for receiving the indication of voting validation, and means (such as a wireless transmitter) for electromagnetically transmitting the vote input, the means for registering vote inputs and each handset being adapted to cause the vote input to be registered by the voting controller if the indication of voting validation is received at the handset.

Although various aspects of the present invention have been described separately hereinabove, any of the aspects of the present invention can be used in conjunction with any other aspect of the present invention to provide an improved system and method.

Embodiments of the present invention will now be described with reference to the accompanying drawings, in which.

Figure 3A:
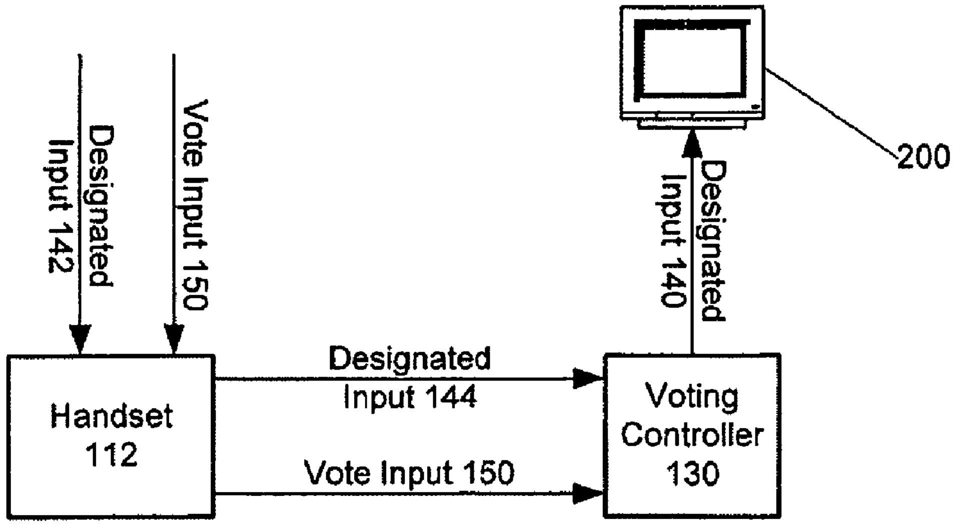
Figure 3B:
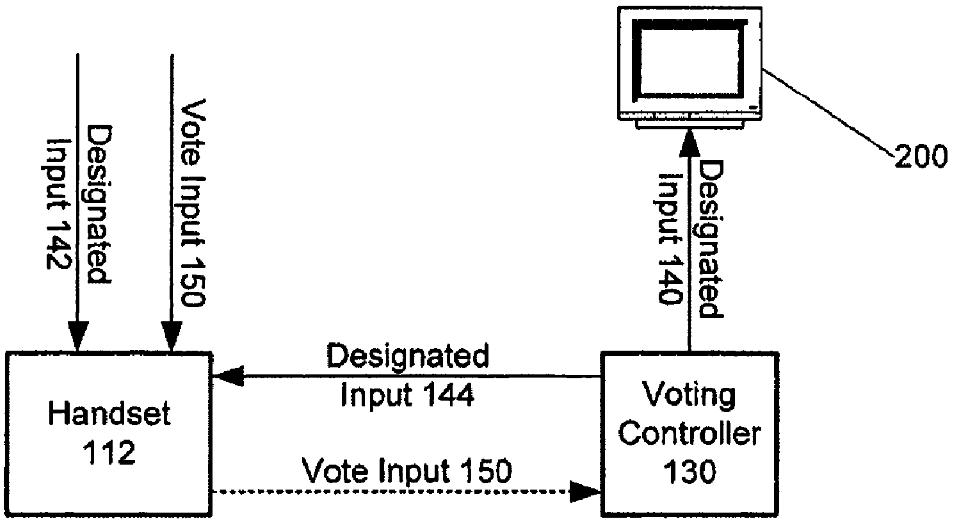
Figure 3C:
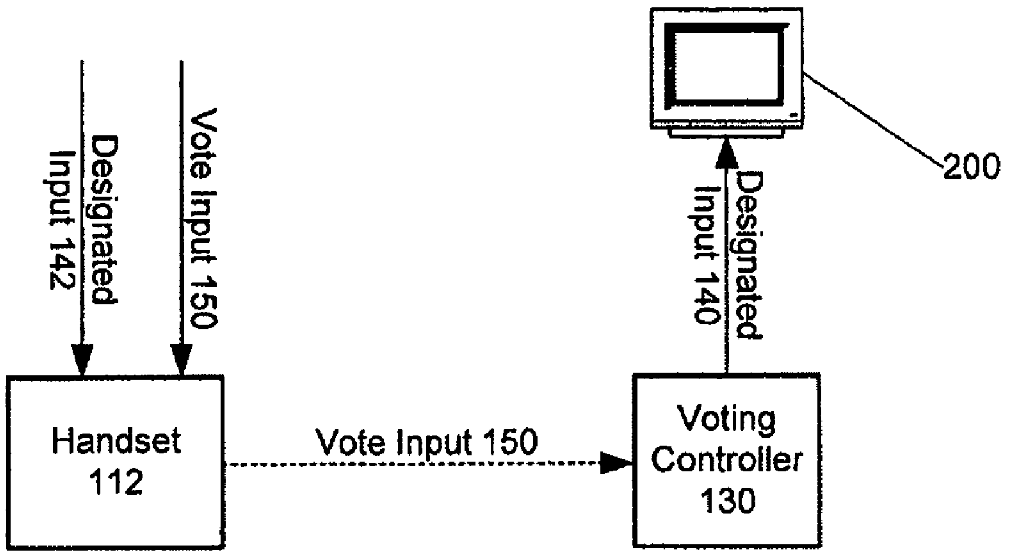
Figure 3D:
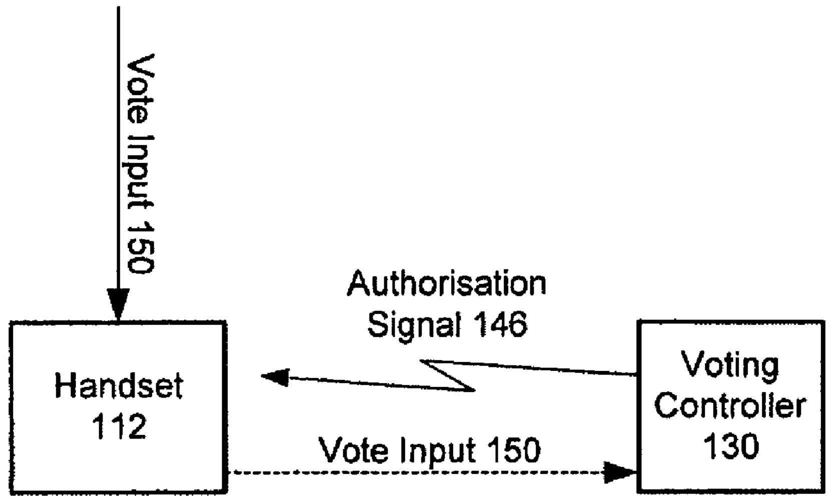
Figure 4:
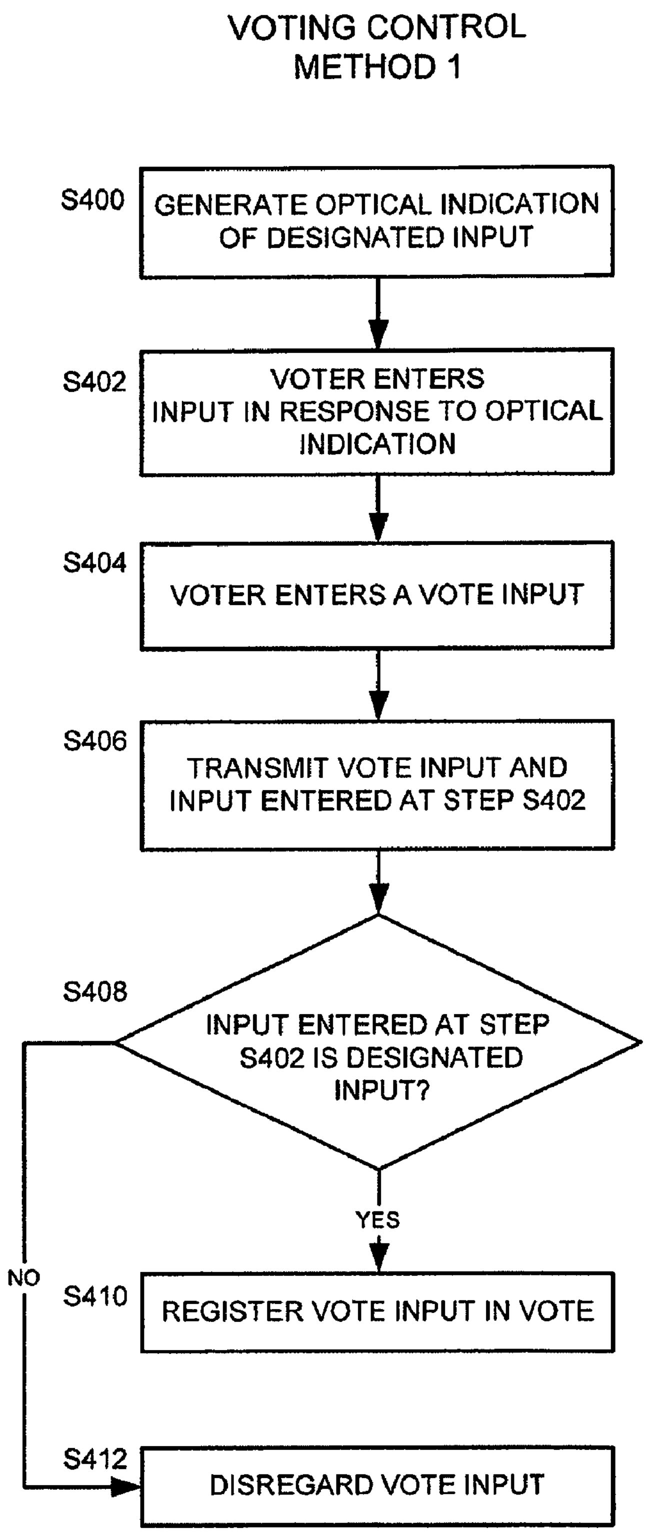
Figure 5:
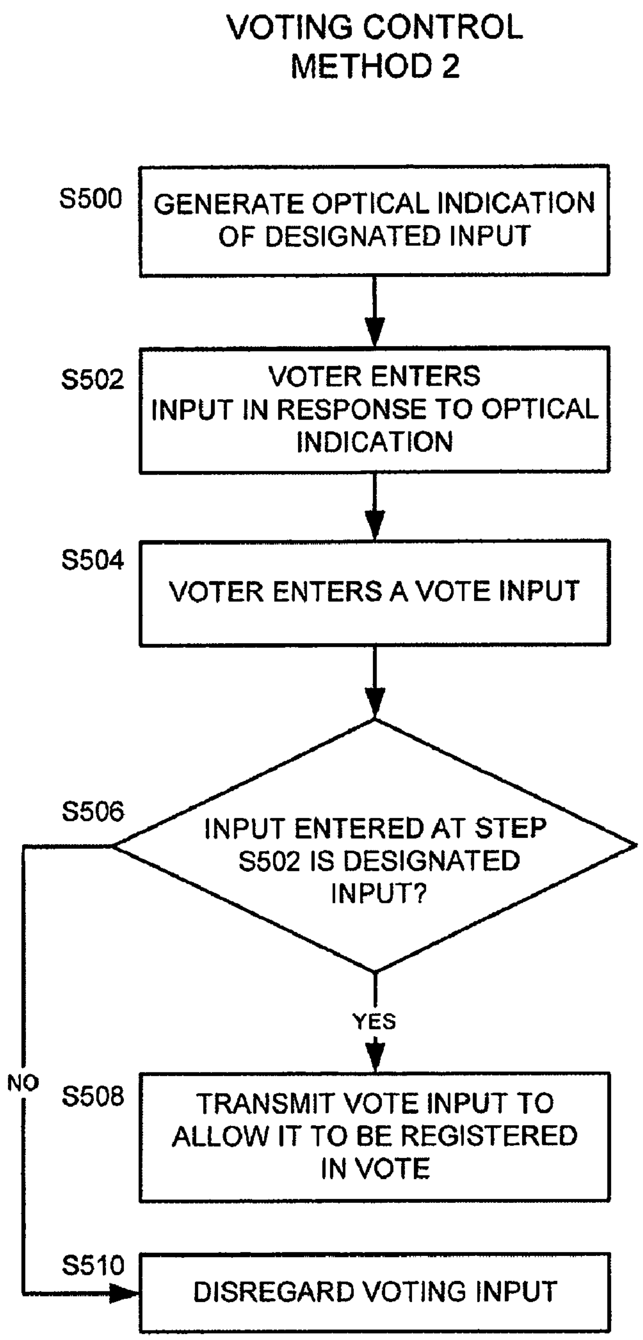

FIG. 3*a* is a schematic diagram of a first embodiment of the wireless voting system;

FIG. 3*b* is a schematic diagram of a second embodiment of the wireless voting system;

FIG. 3*c* is a schematic diagram of a third embodiment of the wireless voting system;

FIG. 3*d* is a schematic diagram of a fourth embodiment of the wireless voting system;

FIG. 4 is a flowchart illustrating a first operating mode of the wireless voting system; and FIG. 5 is a flowchart illustrating a second operating mode of the wireless voting system.

Figure 1:
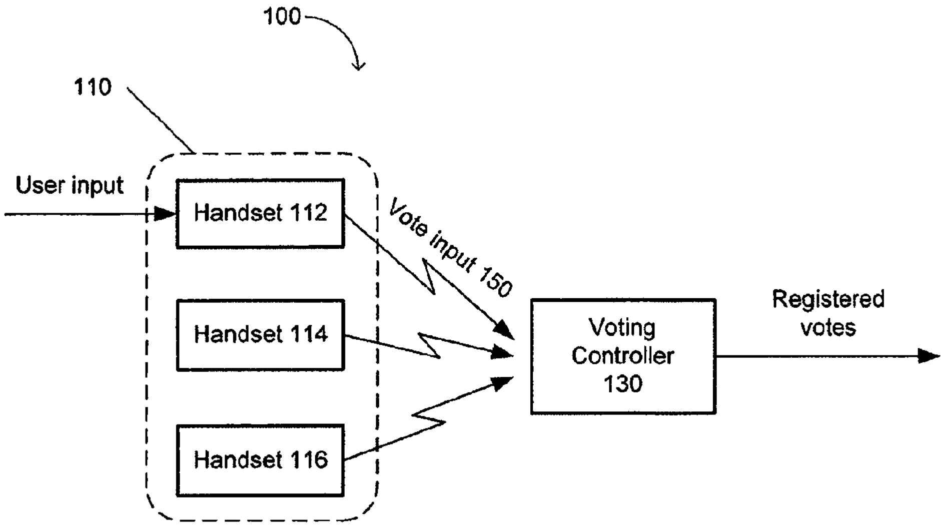
PRIOR ART Fig 1
FIG. 1 is a schematic diagram of a prior art wireless voting system.
Figure 2:
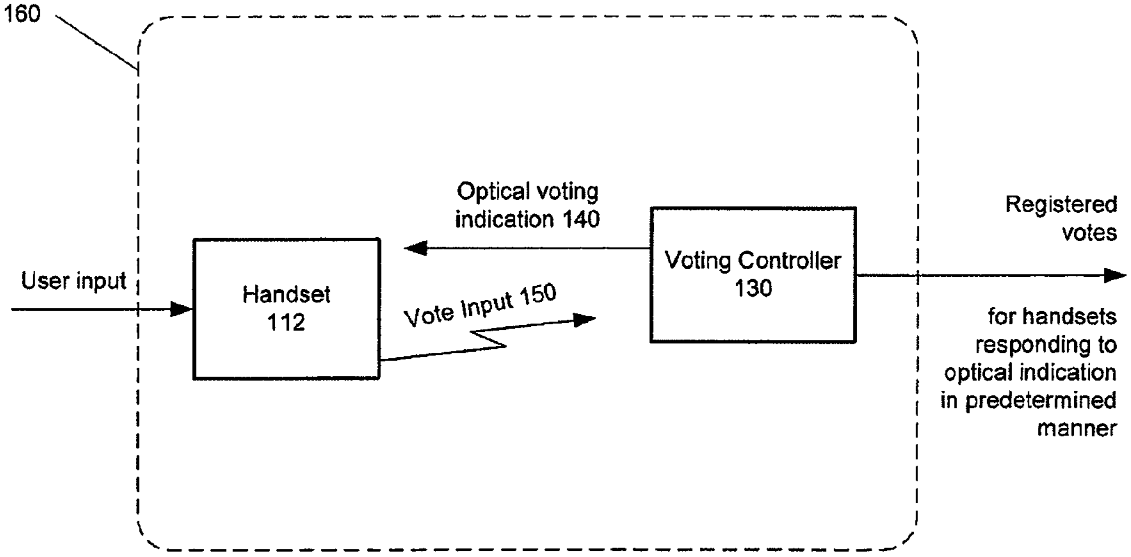
FIG. 2 is a schematic diagram of a wireless voting system in accordance with the invention, in which voting can be restricted to a particular voting area.

FIG. 2 is a schematic of a wireless voting system in accordance with the present invention, in which voting can be restricted to a particular voting area 160, such as a voting room. In FIG. 2, a handset 112 and a voting controller 130 are located within a voting region 160, such as a voting room or conference hall. The handset 112 comprises an input device (such as a keypad) and a transmission device (such as a radio frequency transmitter). The voting controller comprises a reception device (such as a radio frequency receiver) and an interface (such as a video signal output for driving a display).

During a voting period, the voting controller 130 generates an optical voting indication 140, which is then output within the designated voting area. The handset 112 then responds appropriately to the optical voting indication, either with or without input from the user, depending on the embodiment in question (see below). Once such a response has been received by the voting controller 130, any vote input 150 sent from the handset will then be registered. Vote inputs received from handsets which have not responded in the appropriate way (for example, handsets not within sight of the optical indication) will not be registered, thus enforcing the rule that only people present in the voting location may vote.

Four embodiments of the system will now be described with reference to FIGS. 3*a*-3*d.*

FIG. 3*a* is a schematic of a first embodiment of the wireless voting system. A handset 112, voting controller 130 and display 200 are provided.

A visual indication of a designated input 140 is generated by the voting controller 130 and displayed on the display 200, which is viewable within the voting region. The designated input is, for example, a series of numbers which must be entered on a handset keypad, but may be as straightforward as a single action, such as pressing a single button on the handset. The designated input may be displayed in the form of an intelligible instruction for the voters, such as "Press the * key now to vote", or "Enter the code 6143 before voting".

The designated input as viewed 142 is then input by the voter into the input device (not shown) of the handset 112 within a voting period. A representation of the designated input 144 entered by the voter is transmitted to the voting controller with a vote input 150 entered by the voter. The voting controller then registers the vote if the representation of the designated input 144 entered by the user matches the displayed designated input 140. Vote inputs received without appropriate designated inputs will normally be discarded.

FIG. 3*b* is a schematic of a second embodiment of the wireless voting system. Again, a handset 112, voting controller 130 and display 200 are provided.

As before, a visual indication of a designated input 140 is generated, and displayed within the voting region using the display 200. The designated input as viewed by the user 142 is then entered into the input device (not shown) of the handset 112 within a voting period. In this embodiment, a representation of the designated input 144 is transmitted to the handset 112 by the voting controller. The handset then transmits a vote input 150, entered by the user, if the representation of the designated input 144 received from the voting controller matches the designated input 142 entered by the voter. Otherwise the vote input is not sent, and accordingly will not be registered.

FIG. 3*c* is a schematic of a third embodiment of the wireless voting system. A handset 112, voting controller 130 and display 200 are provided.

As before, a visual indication of a designated input 140 is generated, and displayed within the voting region using the display 200. The designated input as viewed by the user 142 is then entered into the input device (not shown) of the handset 112 within a voting period. In this embodiment, a representation of the designated input is computed at the handset 112 as well as in the voting controller 130 in accordance with a random number generator seeded with a known value (the system time). The handset then transmits to the voting controller 130 the vote input 150 if the designated input computed at the handset matches the designated input 142 entered by the voter.

FIG. 3*d* is a schematic of a fourth embodiment of the wireless voting system. A handset 112 and voting controller 130 are provided.

In this system, the voting controller 130 includes a transmission device (such as an infra-red lamp or LED, for example) for transmitting a substantially line-of-sight authorisation signal 146. If the authorisation signal 146 is received by a corresponding reception device in the handset 112 (also not shown), the handset is permitted to cast a vote. The user may be permitted to cast a vote for a predetermined time after the authorisation signal 146 is received, thus ensuring that the user is in the voting area during the vote, whilst not necessarily requiring line-of-sight when the vote is cast.

Two modes of operation of the system will now be described with reference to FIGS. 4 and 5.

A first mode of operation corresponding to the preferred embodiment is illustrated by the flowchart of FIG. 4. In step S400, a voting controller 130 generates an optical indicator of a designated input, which is then displayed in an appropriate fashion, as described above. In step S402, a voter enters the designated input 142 using an input device of a handset, and also (not necessarily substantially simultaneously or in any order) enters a vote input (step S404). The handset 112 then transmits the vote input 150 and the designated input 142, as entered by the voter, using a transmission device in the handset (step S406). A reception device in the voting controller 130 receives the vote input 150 and designated input 142 entered by the voter, and checks to see if the designated input 142 entered by the voter matches the designated input 140 as displayed (step S408). If the designated input is entered correctly, the vote input is registered in the vote (step S410). If not, the vote input is disregarded (step S412), and the system can thus ensure that the voting rules are not violated. If the voter does not enter any designated input, step S402 may be omitted, with the effect that the vote input is disregarded.

In a second mode of operation corresponding to the second and third embodiments, is illustrated by the flowchart of FIG. 5. In step S500, the voting controller 130 generates an optical indicator of a designated input, which is then displayed in an appropriate fashion, as described above. In step S502, the voter enters the designated input 142 using an input device of a handset 112, and also (not necessarily substantially simultaneously or in any order) enters a vote input (step S504). The handset 112 then compares the designated input 142 provided by the voter with the designated input 140 displayed in the voting area (step S506), which input 140 has either already been transmitted to the handset 112 (the second embodiment) or independently generated in the handset 112 (the third embodiment). If the designated inputs match, the vote input is transmitted using a transmission device 120 in the handset (step S406), and subsequently received by a reception device 132 in the voting controller 130, and then registered in the vote. If the designated input has not been entered correctly, the vote input is disregarded (step S512) without being transmitted, and thus the system can ensure that the voting rules are not violated. In a variant of the first, second and third embodiments, additional steps are provided of (a) initially locking the keypad, and (b) unlocking the keypad when the designated input has been entered. If the voter does not enter any designated input, step S502 may be omitted, with the effect that the vote input is not transmitted.

The designated input may be chosen in dependence on the output of a random number generator. For example, a four digit number may be chosen by computing R (modulus) 10000, where R is a large random number generated by a conventional random number generator. Furthermore, if a predictable seed (such as the system time) is used, a pseudo-random designated input can be computed independently in the handsets and in the voting controller, avoiding the need to transmit the designated input between handsets and wireless controller. To ensure security, digital certification and encryption techniques can be applied to the representations of designated inputs transmitted wirelessly within the system.

In all of the above embodiments, authorisation to vote, namely the entering of the designated input by the voter, is carried out before the voting period. It may alternatively or additionally be carried out at the beginning of the voting period, or throughout. Furthermore, the four embodiments may be provided in any appropriate combination, for example in a system where both the handset and the voting controller perform a check that the voter has entered the designated input.

The system can be made more flexible by the use of multiple displays, possibly in multiple locations. The system can be combined with videoconferencing technologies, for example to allow votes to be conducted electronically at a number of different sites, but only within sight of a videoconference screen on which the designated input is displayed.

The wireless voting system can also be used in other applications, for example to control other functions of wireless handsets of the type known in the art. Thus, participants at conferences, for example, may only be permitted to speak or otherwise contribute to a conference session after entering a designated input, or having the keypad otherwise respond to an optical indicator as described above. This can prevent delegates outside a conference hall from interrupting proceedings, accidentally or otherwise.

The use of a voting controller has been described herein with respect to its functions of validating handsets, otherwise controlling the handsets, and registering votes. As is described, for example, in GB 2 392 056, this functionality can be performed by other entities, and/or distributed between different devices. Thus, for example, the optical voting indicator could be generated by a security server (such as a PC workstation), the handsets could be controlled and the votes registered using a master handset, and the validation could be performed by individual handsets in accordance with the third embodiment described above. In such a system. the display could either be the display of the master handset or the screen of the security server. Alternatively a designated input may be orally communicated by the operator of the master handset or security server to the users within the voting area. Other permutations and possibilities are of course possible.

In addition to the display of alphanumeric codes and the like, the optical voting indicator could, for example, be a pure colour output for display on a screen, the colour corresponding to the colour of a button which the user must press on the handset. A designated input conveyed by the optical indicator could be an instruction regarding when to do something, alternatively or additionally to an instruction regarding what to do. Thus the designated input may an instruction to press a known key at an unknown time or times (for example: "Press the VOTE key three times within the next five seconds").

Although the present invention has been described hereinabove with reference to specific embodiments, it will be apparent to a skilled person in the art that modifications lie within the spirit and scope of the present invention.

The invention claimed is:

1. A wireless voting method restricting the registration of votes to votes from voters within an authorized voting region bounded by optically opaque walls, the method comprising:

arranging an optical output arrangement in the authorized voting region;

optically outputting an optical voting indication from the optical arrangement based on a signal from a voting controller, the optical output being the only output of the voting indication, thereby restricting the voting indication to the authorized voting region, -the optical voting indication comprising an optical output transmitted into and restricted within the authorized voting region and being directed to and the same for all voters;

providing a portable handsets to each of a plurality of voters to enable each voter to input a vote and to carry the handset into and out of the authorized voting region;

controlling each handsets to receive a vote input by a voter, and to receive a vote enabling input derived from the optical voting indication, the vote enabling input being the same for all the handsets, the plurality of handsets being capable of electromagnetically transmitting the vote input by a user to the voting controller;

controlling the voting controller to receive and process transmitted vote inputs, said voting controller being capable of registering the vote inputs; and controlling the voting controller and/or each handset in response to the vote enabling input to enable the vote inputs to be processed and registered, wherein any vote inputs received by handsets that did not receive the vote enabling input are disregarded.

2. A wireless voting method according to claim 1, wherein the optical arrangement is a display arrangement, the optical indication is a displayed designated input, and the vote enabling input further comprises the designated input entered by a voter at a handset.

3. A wireless voting method according to claim 2, wherein the designated input includes a code.

4. A wireless voting method according to claim 3, wherein the code is an alphanumeric sequence.

5. A wireless voting method according to claim 2, further comprising generating the designated input.

6. A wireless voting method according to claim 5, wherein the designated input is generated in accordance with a random number algorithm.

7. A wireless voting method according to claim 5, wherein the designated input is generated in dependence on a determinable property of the system.

8. A wireless voting method according to claim 7, wherein the property is a measurement of time.

9. A wireless voting method according to claim 5, wherein the designated input is generated at the voting controller.

10. A wireless voting method according to claim 5, wherein a copy of the designated input is generated at each handset and compared with the designated input as input by the voter for validation.

11. A wireless voting method according to claim 2, wherein the designated input is transmitted to each handset.

12. A wireless voting method according to claim 1, wherein controlling of the voting controller and/or each handset further comprises transmitting the vote input from a handset to the voting controller in dependence on whether the designated input is entered at the handset.

13. A wireless voting method according to claim 2, wherein the controlling of the voting controller and/or each handset further comprises transmitting the designated input from each handset to the voting controller, and registering the vote input in dependence on whether the designated input is received at the voting controller.

14. A wireless voting system according to claim 2, wherein the optical voting indication is displayed at a plurality of locations in the authorized voting region.

15. A wireless voting method according to claim 1, wherein controlling each handset further comprises controlling each handset to detect the optical voting indication output from the optical output arrangement to generate the vote enabling input for the handset.

16. A wireless voting method according to claim 15, wherein controlling each handset further comprises transmitting the vote input from the handset to the voting controller in dependence on whether the optical voting indication is received at the handset.

17. A wireless voting method according to claim 1, wherein the optical voting indication is output during a voting period to which the vote input relates.

18. A wireless voting method according to claim 1, wherein the optical voting indication is output before the start of a voting period to which the vote input relates.

19. A wireless voting method according to claim 1, further comprising allowing voting functions to be performed by the user of a handset on receipt of the optical voting indication at the handset.

20. A wireless voting method according to claim 1, further comprising allowing non-voting functions to be performed by the user of a handset irrespective of receipt of the optical voting indication at the handset.

21. A wireless voting system for restricting registration of votes to votes from voters within an authorized voting region bounded by optically opaque walls, the system comprising:

a voting controller having an interface to provide an output to generate an optical voting indication in the authorized voting region for voting validation, a reception device for receiving electromagnetically transmitted vote inputs, and a processor programmed to register vote inputs, wherein the optical voting indication is the same for all the voters;

an optical output arrangement for outputting the optical voting indication directed to all voters into and restricted within the authorized voting region; and a plurality of handsets portable inside and outside the authorized voting region for carrying by the voters, each handset comprising an input arrangement for receiving a vote enabling input derived from the optical voting indication and a vote input from a user, and a transmission device for electromagnetically transmitting the vote input, wherein the vote enabling input is the same for all the handsets;

the voting controller and/or each handset being adapted to cause the vote input to be registered by the voting controller if the vote enabling input is received at the handset.

22. A wireless voting system according to claim 21, wherein the optical arrangement comprises a display arrangement, the optical indication is a displayed designated input, and the input arrangement is adapted to allow the user to enter the vote enabling input as the designated input at the handset.

23. A wireless voting system according to claim 22, wherein the voting controller processor is further programmed to generate the displayed designated input.

24. A wireless voting system according to claim 23, wherein the voting controller processor is programmed to generated the designated input in accordance with a random number algorithm.

25. A wireless voting system according to claim 23, the voting controller processor is programmed to generated the designated input in accordance with a determinable property of the system.

26. A wireless voting system according to claim 25, wherein the property is a measurement of time.

27. A wireless voting system according to claim 23, wherein each handset comprises a processor, the processor being programmed also to generate a copy of the designated input for comparison with the input designated input at the handset for validation.

28. A wireless voting system according to claim 22, wherein the voting controller further comprises a transmission device for transmitting the designated input to each handset, and each handset further comprises a reception device for receiving the designated input.

29. A wireless voting system according to claim 22, wherein the transmission device at each handset is adapted to transmit the vote input to the voting controller in dependence on whether the appropriate designated input is entered at the handset.

30. A wireless voting system according to claim 22, wherein the transmission device at each handset is adapted to transmit the designated input to the voting controller, the reception device at the voting controller is adapted to receive the designated input, and the processor at the voting controller is programmed to register the vote input in dependence on whether the designated input is received by the reception device at the voting controller.

31. A wireless voting system according to claim 21, wherein each handset further comprises an optical reception device for receiving the optical voting indication output from the optical output arrangement to generate the vote enabling input for the handset.

32. A wireless voting system according to claim 31, wherein the transmission device at each handset is adapted to transmit the vote input to the voting controller in dependence on whether the optical voting indication is received at the handset.

33. A wireless voting system according to claim 21, wherein the voting controller is adapted to output the optical voting indication during a voting period to which the vote input relates.

34. A wireless voting system according to claim 21, wherein the voting controller is adapted to output the optical voting indication before the start of a voting period to which the vote input relates.

35. A wireless voting system according to claim 21, wherein each handset is adapted to allow voting functions to be performed by the user on receipt of the optical voting indication.

36. A wireless voting system according to claim 21, wherein each handset is adapted to allow non-voting functions to be performed by the user irrespective of receipt of the optical voting indication.

37. A wireless voting method comprising:

displaying a voting indication on at least one display screen in a room, the display being the only output of the voting indication, thereby restricting the voting indication to the room, the voting indication being the same for all voters;

providing a plurality of portable handsets to voters to enable to the handsets to be carried into and out of the room; and controlling each handset to enable the voting indication and a vote input to be received as an input from a voter, each handset being capable of electromagnetically transmitting the vote input by a user to a vote registering arrangement, wherein each handset and/or the vote registering arrangement are controlled to register votes for each handset when the voting indication is received as an input from a voter.

38. A wireless voting system comprising:

a voting controller for controlling at least one display screen in a room to display a voting indication, the display being the only output of the voting indication, thereby restricting the voting indication to the room, the voting indication being the same for all voters; and a plurality of portable handsets capable of being carried by voters into and out of the room, each handset being adapted to enable the voting indication and a vote input to be received as an input from a voter, each handset being capable of electromagnetically transmitting the vote input by a user to the voting controller, wherein each handset and/or the voting controller are adapted to be controlled to register votes for each handset when the voting indication is received as an input from a voter.

39. A wireless voting system for restricting the registration of votes to within an authorized voting region, the system comprising:

voting control means to generate and output an optical voting indication into and restricted within the authorized voting region for voting validation, to receive electromagnetically transmitted vote inputs, and to register vote inputs, the optical voting indication being the same for all voters; and a plurality of handsets portable inside and outside the authorized voting region, each handset comprising input means for receiving a vote enabling input derived from the optical voting indication and a vote input from a user, and a transmission means for electromagnetically transmitting the vote input, the vote enabling input being the same for all the handsets;

the voting control means and/or each handset being adapted to cause the vote input to be registered by the voting controller if the vote enabling input is received at the handset.

40. A wireless voting method comprising:

transmitting an optical voting indication into a room;

providing a plurality of portable handsets to voters to enable the handsets to be carried into and out of the room; and controlling each handset to optically receive the transmitted optical voting indication and to enable a vote to be received as an input from a voter, each handset being capable of electromagnetically transmitting the vote input by a user to a vote registering arrangement, wherein each handset and/or the vote registering arrangement are controlled to register votes for each handset when the optical voting indication is optically received by a handset.

41. A wireless voting system comprising:

a voting controller for transmitting an optical voting indication into a room and for registering vote inputs; and a plurality of portable handsets capable of enabling the handsets to be carried into and out of the room by voters, each handset being adapted to optically receive the transmitted optical voting indication and to enable a vote input to be received as an input from a voter, each handset being capable of electromagnetically transmitting the vote input by a user to a vote registering arrangement, wherein each handset and/or the vote registering arrangement are adapted to be controlled to register votes for each handset when the optical voting indication is optically received by a handset.

* * * * *